United States Patent
Bourgeois et al.

(10) Patent No.: US 9,499,014 B2
(45) Date of Patent: Nov. 22, 2016

(54) TIRE WITH IMPROVED BEADS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Frédéric Bourgeois, Clermont-Ferrand (FR); François-Xavier Bruneau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 352 days.

(21) Appl. No.: 14/361,498

(22) PCT Filed: Nov. 28, 2012

(86) PCT No.: PCT/EP2012/073834
§ 371 (c)(1),
(2) Date: May 29, 2014

(87) PCT Pub. No.: WO2013/079529
PCT Pub. Date: Jun. 6, 2013

(65) Prior Publication Data
US 2014/0360647 A1    Dec. 11, 2014

Related U.S. Application Data

(60) Provisional application No. 61/595,476, filed on Feb. 6, 2012.

(30) Foreign Application Priority Data

Nov. 29, 2011   (FR) ...................... 11 60908

(51) Int. Cl.
*B60C 15/00* (2006.01)
*B60C 15/06* (2006.01)
*B60C 1/00* (2006.01)

(52) U.S. Cl.
CPC ......... *B60C 15/0628* (2013.04); *B60C 1/0025* (2013.04); *B60C 15/06* (2013.01); *B60C2015/009* (2013.04); *B60C 2015/061* (2013.04); *B60C 2015/065* (2013.04); *B60C 2015/0621* (2013.04); *B60C 2015/0678* (2013.04); *B60C 2015/0682* (2013.04)

(58) Field of Classification Search
CPC ... B60C 15/00; B60C 15/06; B60C 15/0603; B60C 15/0628; B60C 15/0632
See application file for complete search history.

(56) References Cited

U.S. PATENT DOCUMENTS

2012/0073724 A1   3/2012  Daval

FOREIGN PATENT DOCUMENTS

FR         2940187 A1     6/2010
WO    WO 2010/072736    *  7/2010

OTHER PUBLICATIONS

PCT/EP2012/073834, International Search Report (ISR), Form PCT/ISA/210, dated Feb. 12, 2013, 4 pgs.

*Primary Examiner* — Justin Fischer
(74) *Attorney, Agent, or Firm* — Dickinson Wright PLLC (57) ABSTRACT

Tire having two beads each comprising an annular reinforcing structure and a carcass reinforcement which is anchored in the two beads by being wrapped around the annular reinforcing structure so as to form, in each bead, a main portion and a wrapped-around portion, wherein each bead comprises an apex situated between the main portion and the wrapped-around portion of the carcass reinforcement, and an outer strip positioned axially on the outside of the carcass reinforcement and of the apex, the apex and the outer strip being made of a rubber compound that has an elastic modulus G' less than or equal to 15 MPa and a viscous modulus G" such that: G"[MPa]≤0.2·G'[MPa]−0.2 MPa, the elastic and viscous moduli being measured at 23° C.; wherein the entity formed by the apex and the outer strip has a thickness E(r), the thickness E(r) varying such that, in the range of distances r comprised between 25 and 45% of the height H of the tire, the variation in thickness $$\frac{\partial E(r)}{\partial r}$$

is less than or equal to −0.25 mm/mm over at least 4% of the height H of the tire, that, in the range of distances r comprised between 15 and 35% of the height H, the variation in thickness

$$\frac{\partial E(r)}{\partial r}$$

is greater than or equal to 0.20 mm/mm over at least 2% of the height H of the tire, and that, in the range of distances r comprised between 10 and 20% of the height H of the tire, the variation in thickness

$$\frac{\partial E(r)}{\partial r}$$

is greater than or equal to −0.10 mm/mm and less than or equal to 0.0 mm/mm over at least 5% of the height H of the tire.

6 Claims, 8 Drawing Sheets

TIRE WITH IMPROVED BEADS

This application is a 371 national phase entry of PCT/EP2012/073834, filed 28 Nov. 2012, which claims benefit of FR 1160908, filed 29 Nov. 2011 and of U.S. Provisional Application Ser. No. 61/595,476, filed 6 Feb. 2012, the entire contents of each of which are incorporated herein by reference for all purposes.

BACKGROUND

1. Field

The present disclosure relates to passenger vehicle tires.

2. Description of Related Art

Most passenger vehicle tires comprise:
- two beads intended to come into contact with a mounting rim, each bead comprising at least one annular reinforcing structure;
- two sidewalls extending the beads radially outwards, the two sidewalls meeting in a crown comprising a crown reinforcement surmounted by a tread;
- at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion;
- an apex situated radially on the outside of the annular reinforcing structure and at least partially between the main portion and the wrapped-around portion of the carcass reinforcement, and
- an outer strip positioned axially on the outside of the carcass reinforcement and of the apex.

Recently, there have been proposals to improve the rolling resistance of passenger vehicle tires by optimizing the beads thereof. Document WO 2010/072736 notably teaches the use of special rubber compounds. The outer strip and possibly the apex are made using rubber compounds that have an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C.

That document also recommends further reducing the rolling resistance by optimizing the geometry of that or those portions of the tire that have these moduli: the portion of rubber compound having an elastic modulus G' less than or equal to 15 MPa and a viscous modulus G" such that:

$$G''[\text{MPa}] \leq 0.2 \cdot G'[\text{MPa}] - 0.2 \text{ MPa},$$

has, in any radial cross section, a thickness $E(r)$, this thickness corresponding to the length of the intersection of the direction perpendicular to the main portion of the carcass reinforcement with the said portion of rubber composition, r denoting the distance separating the intersection of the said direction perpendicular to the main portion of the carcass reinforcement from the radially innermost point of the annular reinforcing structure. The thickness $E(r)$ varies such that, in the range of distances r comprised between 20 and 50 mm, the variation in thickness $$\frac{\partial E(r)}{\partial r}$$

is less than or equal to −0.25 mm/mm (and preferably less than or equal to −0.3 mm/mm) over at least 5 mm. In other words, it is advantageous to ensure that the entity formed by the apex and the outer strip is "squat", that is to say shorter and wider than in conventional tires.

When implementing this teaching in tires which traditionally have very stiff (in excess of 50 MPa) apexes, it has been found that the incorporation of thick outer strips presents a problem of industrial robustness. Because the quantities of rubber compound involved are fairly great, it is difficult to prevent rubber from moving while the tires are being cured. As a result, the proportion of tires that fail to meet the specifications increases significantly and the movements of the rubber impair the compromise between rolling distance and cornering stiffness.

SUMMARY

One of the objects of embodiments of the present invention is to define a tire that has low rolling resistance and high cornering stiffness without impairing industrial robustness.

This object is achieved by a careful choice of external strip geometry.

More specifically this object is achieved by a tire comprising:
- two beads intended to come into contact with a mounting rim, each bead comprising at least one annular reinforcing structure;
- two sidewalls extending the beads radially outwards, the two sidewalls meeting in a crown comprising a crown reinforcement surmounted by a tread;
- at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion, each wrapped-around portion extending radially outwards as far as an end situated a radial distance DRR from the innermost point of the annular reinforcing structure of the bead, the radial distance DRR being greater than or equal to 10%, (and preferably less than or equal to 20%), of the radial height H of the tire;
- in which each bead comprises an apex, the apex being situated radially on the outside of the annular reinforcing structure and at least partially between the main portion and the wrapped-around portion of the carcass reinforcement, the apex extending radially outwards from the radially innermost point of the annular reinforcing structure of the bead as far as radial distance DRB from the said point, the radial distance DRB being greater than or equal to 20% and less than or equal to 30% of the radial height H of the tire,
- in which each bead further comprises an outer strip positioned axially on the outside of the carcass reinforcement and of the apex, each outer strip extending radially between a radially inner end of the outer strip and a radially outer end of the outer strip, the radially inner end of the outer strip being situated at a radial distance DRI from the radially innermost point of the annular reinforcing structure of the bead, the radial distance DRI being less than or equal to 20% of the radial height H of the tire, the radially outer end of the outer strip being situated at a distance DRL from the radially innermost point of the annular reinforcing structure of the bead, the radial distance DRL being greater than or equal to 25% (and preferably greater than or equal to 30% and less than or equal to 45%) of the radial height H of the tire,
- in which the outer strip (and preferably also the apex) is made of a rubber compound that has an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C.;

in which the entity formed by the apex and the outer strip has a thickness E(r), this thickness corresponding to the length of the intersection of the direction perpendicular to the main portion of the carcass reinforcement with the said entity, r denoting the distance separating the intersection of the said direction perpendicular to the main portion of the carcass reinforcement from the radially innermost point of the annular reinforcing structure, the thickness E(r) varying such that, (1) in the range of distances r comprised between 25 and 45% of the height H of the tire, the variation in thickness $$\frac{\partial E(r)}{\partial r}$$

is less than or equal to −0.25 mm/mm (and preferably less than or equal to −0.3 mm/mm) over at least 4% of the height H of the tire, (2) in the range of distances r comprised between 15 and 35% of the height H of the tire, the variation in thickness $$\frac{\partial E(r)}{\partial r}$$

is greater than or equal to 0.20 mm/mm over at least 2% of the height H of the tire, and (3) in the range of distances r comprised between 10 and 20% of the height H of the tire, the variation in thickness $$\frac{\partial E(r)}{\partial r}$$

is greater than or equal to −0.10 mm/mm and less than or equal to 0.0 mm/mm over at least 5% of the height H of the tire.

According to a preferred embodiment, the portion of the tire that is axially outside the outer strip is made of a rubber compound that is different from the rubber compound of which the outer strip is made and has a substantially constant thickness. In other words, the portion of the tire that is axially outside the outer strip has a thickness EE(r) varying such that the variation in thickness $$\frac{\partial EE(r)}{\partial r}$$

is greater than or equal to −0.20 mm/mm and less than or equal to 0.20 mm/mm for r values that are comprised between r=ri+0.20·(re−ri) and r=ri+0.85·(re−ri), where "ri" designates the r value of the radially inner end of the outer strip and "re" designates the r value of the radially outer end of the outer strip.

DETAILED DESCRIPTION OF SPECIFIC EMBODIMENTS

It is appropriate to distinguish several different uses of the term "radial" by those skilled in the art. Firstly the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress is said to be made "radially inwards (or outwards)" when progressing towards smaller (or larger) radii. Where radial distances are involved, it is this sense of the term that applies also.

By contrast, a thread or reinforcement is said to be "radial" when the thread or the reinforcing elements of the reinforcement make an angle greater than or equal to 80° and less than or equal to 90° with the circumferential direction. Let us specify that in this document, the term "thread" is to be understood in an entirely general sense and encompasses threads in the form of monofilaments, multifilaments, cords, folded yarns or equivalent assemblies, that being the case irrespective of the material of which the thread is made or the surface treatment it may have received to enhance its bonding to the rubber.

Finally, a "radial section" or "radial cross section" means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further away from the median plane of the tire than is the point P8. The "median plane" of the tire is the plane perpendicular to the axis of rotation of the tire and which lies equidistant between the annular reinforcing structures of each bead.

A "circumferential" direction is a direction perpendicular both to a radius of the tire and to the axial direction.

Within the context of this document, the expression "rubber compound" denotes a rubber compound containing at least an elastomer and a filler.

Figure 1:
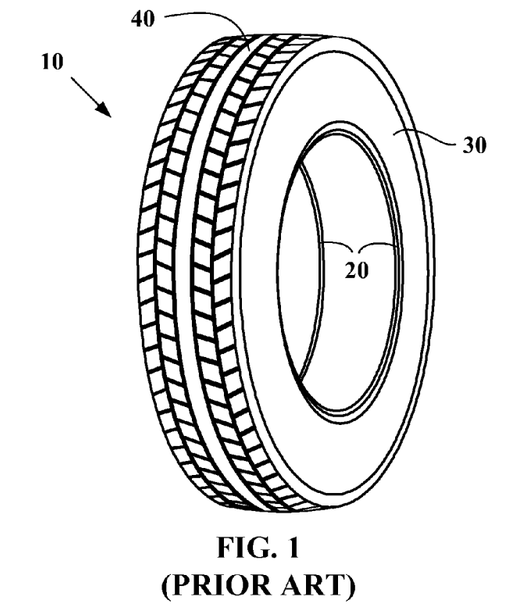
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
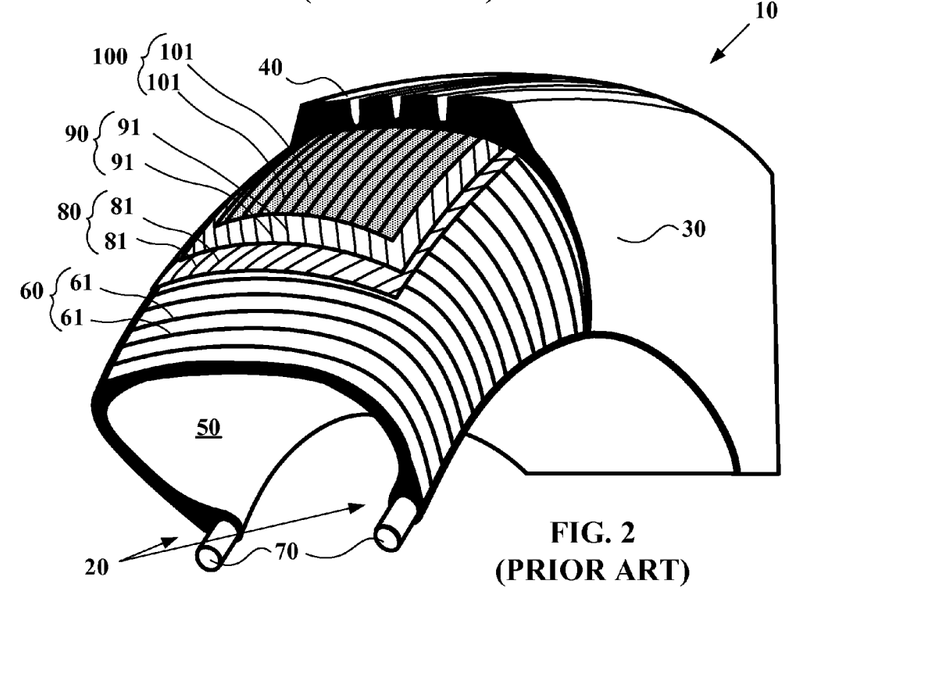
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 consisting of threads 61 coated with rubber compound, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced by thread-like reinforcing elements 81 and 91 which are parallel within each layer and crossed from one layer to the other, making angles comprised between 10° and 70° with the circumferential direction. The tire also comprises a hooping reinforcement 100, positioned radially on the outside of the crown reinforcement, this hooping reinforcement being formed of reinforcing elements 101 directed circumferentially and wound in a spiral. A tread 40 is laid on the hooping reinforcement; it is this tread 40 which provides contact between the tire 10 and the road. The tire 10 depicted is a "tubeless" tire: it comprises an "inner liner" 50 made of a rubber compound impervious to the inflating gas, covering the interior surface of the tire.

Figures 3, 4:
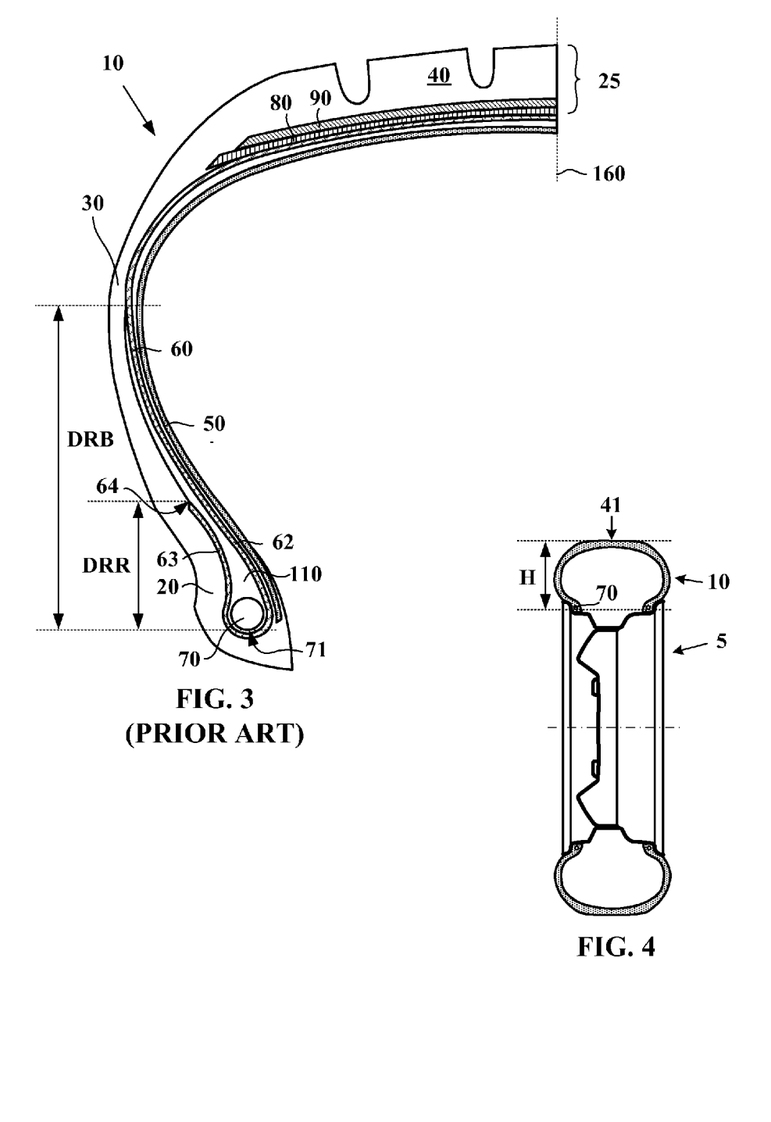
FIG. 3 depicts, in radial section, one quarter of a tire according to the prior art.
FIG. 4 illustrates how the height H of the tire is determined.

FIG. 3 schematically depicts, in radial section, one quarter of a tire 10 according to the prior art. The tire 10 comprises two beads 20 intended to come into contact with a mounting rim (not depicted), each bead 20 comprising an annular reinforcing structure, in this instance a bead wire 70. Two sidewalls 30 extend the beads 20 radially outwards and meet in a crown 25 comprising a crown reinforcement formed of a first layer of reinforcements 80 and of a second layer of reinforcements 90 and surmounted radially by tread 40. Each layer of reinforcements comprises thread-like reinforcements coated in a matrix formed of rubber compound. The reinforcements in each layer of reinforcements are substantially mutually parallel; reinforcements in the two layers are crossed from one layer to the other at an angle of about 20°, as is well known to those skilled in the art for tires of the radial variety.

The tire 10 further comprises a carcass reinforcement 60 which extends from the beads 20 through the sidewalls 30 as far as the crown 25. This carcass reinforcement 60 here comprises thread-like reinforcements directed substantially radially, that is to say making an angle greater than or equal to 65° and less than or equal to 90° with the circumferential direction.

The carcass reinforcement 60 comprises a plurality of carcass reinforcing elements and is anchored in the two beads 20 by being wrapped around the bead wire, so as to form, in each bead, a main portion 62 and a wrapped-around portion 63. The wrapped-around portion extends radially outwards as far as an end 64 situated a radial distance DRR from the radially innermost point 71 of the annular reinforcing structure the bead, the radial distance DRR here being equal to 22% of the radial height H of the tire.

The "radial height" H of a tire is defined as being the radial distance between the radially innermost point 71 of the annular reinforcing structure 70 of the bead 20 and the radially outermost point 41 (FIG. 4) of the tread 40 when the tire 10 is mounted on a mounting rim 5 (as has been depicted in FIG. 4) and inflated to its service pressure.

Each bead comprises an apex 110, the apex being situated radially on the outside of the bead wire 70 and, for a good proportion, between the main portion 62 and the wrapped-around portion 63 of the carcass reinforcement 60.

The apex 110 extends radially outwards from the radially innermost point 71 of the annular reinforcement structure of the bead as far as a radial distance DRB from said point, the radial distance DRB being greater than or equal to 20% of the radial height H of the tire. In this particular instance, the apex 110 extends as far as the equator of the tire. What is meant, in the context of the present document, by the "equator" of the tire is the radial height of the point of greatest axial extension of the carcass reinforcement. In a radial section through the tire, the equator appears as the axial straight line passing through the points at which the carcass reinforcement has its greatest axial width when the tire is mounted on the rim and inflated. When the carcass reinforcement reaches this greatest axial width at a number of points, it is the radial height of the point closest to the mid-height H/2 of the tire that is considered to be the equator of the tire. The equator thus defined should not be confused with the median plane 160 of the tire which is also sometimes known as the "equator" in documents of the prior art.

The interior surface of the tire 10 is covered with an inner liner 50.

Figure 5:
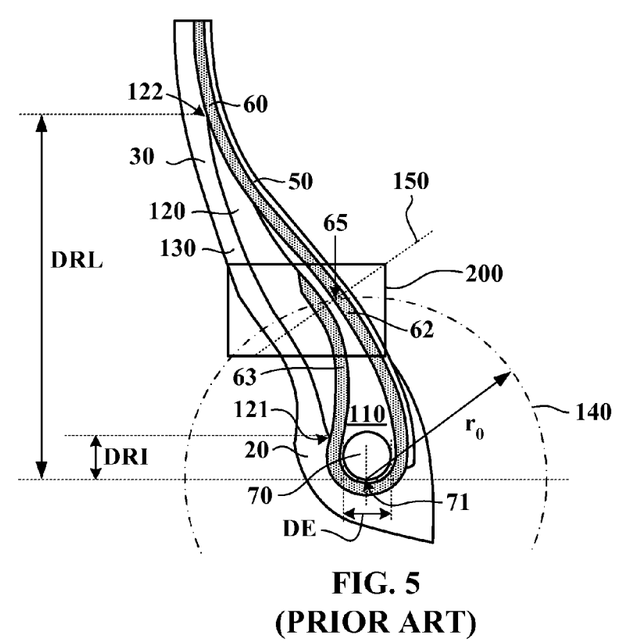
FIGS. 5 and 6 illustrate how the variation of the thickness of the entity formed by the apex and the outer strip is determined.

It is also a known practice to provide an outer strip 120 placed axially on the outside of the carcass reinforcement and of the apex, as in the tire depicted in FIG. 5. Each outer strip 120 extends radially between a radially inner end 121 of the outer strip 120 and a radially outer end 122 of the outer strip 120. The radially inner end 121 of the outer strip 120 is situated a radial distance DRI from the radially innermost point 71 of the annular reinforcing structure 70 of the bead, DRI being less than or equal to 20% of the radial height H of the tire. The radially outer end 122 of the outer strip 120 is situated a radial distance DRL from the radially innermost point 71 of the annular reinforcing structure 70 of the bead, the radial distance DRL being greater than or equal to 25% and less than or equal to 50% of the radial height H of the tire. The portion of the tire that is axially outside the outer strip 120 is designated by reference 130.

Traditionally, in order to form the apex 110 and the outer strip 120 use was made of rubber compounds that have an elastic modulus G' greater than or equal to 40 MPa and a viscous modulus G" comprised between 9 and 10 MPa.

In this document, the terms "elastic modulus G'" and "viscous modulus G''" denote dynamic properties well known to those skilled in the art. These properties are measured on a viscoanalyzer of the Metravib VA4000 type on test specimens moulded from raw compounds or on test specimens bonded together from cured compounds. Test specimens such as those described in the standard ASTM D 5992-96 (the version published in September 2006 but initially approved in 1996) in Figure X2.1 (a circular method) are used. The diameter "d" of the test specimen is 10 mm (so the test specimen therefore has a circular cross section of 78.5 mm$^2$), the thickness "L" of each of the portions of rubber compound is 2 mm, giving a "d/L" ratio of 5 (in contrast with standard ISO 2856, mentioned at paragraph X2.4 of the ASTM standard, which recommends a d/L value of 2).

The response of a test specimen of vulcanized rubber compound subjected to simple alternating sinusoidal shear loading at a frequency of 10 Hz and at a stabilized temperature of 23° C. is recorded. The test specimen is loaded symmetrically about its equilibrium position. The amplitude of deformation sweep ranges from 0.1% to 50% (on the outbound cycle), and then from 50% to 0.1% (on the return cycle). The result used is the dynamic shear elastic modulus (G') and the viscous shear modulus (G") at 10% deformation on the return cycle.

In order to reduce the rolling resistance, document WO 2010/072736 teaches the production of the outer strip, and possibly also of the apex, from a rubber compound that has an elastic modulus G' less than or equal to 15 MPa and a viscous modulus G" such that: G"[MPa]≤0.2·G'[MPa]−0.2 MPa.

Table I gives two examples of such rubber compounds. The composition is given in phr ("per hundred rubber"), that is to say in part by weight per 100 parts by weight of rubber. The corresponding dynamic moduli are also indicated.

TABLE I

| Parts en phr | Compound 1 | Compound 2 |
|---|---|---|
| NR [1] | 100 | 100 |
| N 330 | | |
| N 990 | 85 | 85 |
| Graphite | 40 | |
| Paraffin oil | | |
| Antioxidant (6PPD) [2] | 2 | 2 |
| Cobalt naphthenate | 3 | 3 |
| Stearic acid | 1 | 1 |
| ZnO | 7 | 7 |
| Formaphenol resin | | |
| Hardening agent | | |
| Sulphur | 7 | 7 |
| Accelerator (TBBS) [3] | 1 | 1 |
| G' | 5 | 2 |
| G" | 0.8 | 0.2 |

Notes for Table 1:
[1] Natural rubber
[2] N-(1,3-dimethylbutyl)-N'-phenyl-p-phenylenediamine
[3] N-tert-butyl-2-benzothiazyl sulphonamide The rubber compound is preferably based on at least one diene elastomer, a reinforcing filler and a cross-linking system.

What is meant by a "diene" elastomer (interchangeable with rubber) is, in the known way, an elastomer derived at least in part (i.e. a homopolymer or a copolymer) from diene monomers, i.e. monomers which have two carbon-carbon double bonds, which may or may not be conjugated bonds. The diene elastomer used is preferably chosen from the group consisting of polybutadienes (BR), natural rubber (NR), synthetic polyisoprenes (IR), butadiene-styrene copolymers (SBR), isoprene-butadiene copolymers (BIR), isoprene styrene copolymers (SIR), butadiene-styrene-isoprene copolymers (SBIR) and compounds of these elastomers.

One preferred embodiment uses an "isoprene" elastomer, that is to say a homopolymer or a copolymer of isoprene, or in other words a diene elastomer chosen from the group consisting of natural rubber (NR), synthetic polyisoprenes (IR), the various copolymers of isoprene and compounds of these elastomers.

The isoprene elastomer is preferably natural rubber or synthetic polyisoprene of the cis-1,4 type. Of the synthetic polyisoprenes, those used for preference are polyisoprenes that have a ratio (molar %) of cis-1,4 bonds in excess of 90%, more preferably still in excess of 98%. According to other preferred embodiments, the diene elastomer may consist, fully or in part, of some other diene elastomer such as, for example, SBR elastomer (E-SBR or S-SBR) used either cut with some other elastomer, for example of the BR type, or uncut.

The rubber compound may also contain all or some of the additives customarily used in rubber matrices intended for the manufacture of tires, such as, for example, reinforcing fillers such as carbon black or inorganic fillers such as silica, coupling agents for inorganic fillers, anti-aging agents, antioxidants, plasticizers or extension oils, whether the latter be of the aromatic or non-aromatic kind (notably oils that are very weakly aromatic or non-aromatic, for example of the napthene or paraffin type, with a high or preferably a low viscosity, MES or TDAE oils, plasticizing resins with a high Tg in excess of 30° C.), processability agents that make the compounds easier to process in the raw state, tackifying resins, a cross-linking system based either on sulphur or on sulphur donors, and/or on peroxide, accelerators, vulcanization activators or retarders, anti-reversion agents, methylene acceptors and donors such as HMT (hexamethylenetetramine) or H3M (hexamethoxymethylmelamine) for example, reinforcing resins (such as resorcinol or bismaleimide), known adhesion promoting systems of the metallic salts type for example, notably cobalt or nickel salts.

The compounds are manufactured in suitable mixing mills using two successive phases of preparation well known to those skilled in the art: a first phase of thermomechanical kneading or work (the so-called "non-productive" phase) carried out at high temperature, up to a maximum temperature comprised between 110° C. and 190° C., preferably between 130° C. and 180° C., followed by a second phase of mechanical work (the so-called "productive" phase) up to a lower temperature, typically below 110° C., during which finishing phase the cross-linking system is incorporated.

By way of example, the non-productive phase is carried out in a single thermomechanical step lasting a few minutes (for example between 2 and 10 min) during which all the basic components needed together with other additives with the exception of the cross-linking or vulcanizing system are introduced into an appropriate mixing mill such as a customary internal mixing mill. Once the compound thus obtained has cooled, the vulcanizing system is then incorporated in an external mixing mill such as an open mill kept at low temperature (for example between 30° C. and 100° C.). Everything is then kneaded (productive phase) for a few minutes (for example between 5 and 15 min).

The final compound thus obtained is then calendered, for example rolled into the form of a sheet or slab for characterizing, or alternatively is extruded to form the outer strip used in a tire according to the invention.

Vulcanizing (or curing) can then take place in the known manner at a temperature generally comprised between 130° C. and 200° C., preferably under pressure, for a long enough length of time that may vary for example between 5 and 90 min notably according to the curing temperature, to the vulcanizing system adopted and to the vulcanizing dynamics of the compound in question.

The formulation of the rubber compound used for the apex may be identical to that of the rubber compound that forms the outer strip, with the exception of the addition of cobalt salts to encourage adhesion between the apex and the bead wire, as is well known to those skilled in the art.

Figure 6:
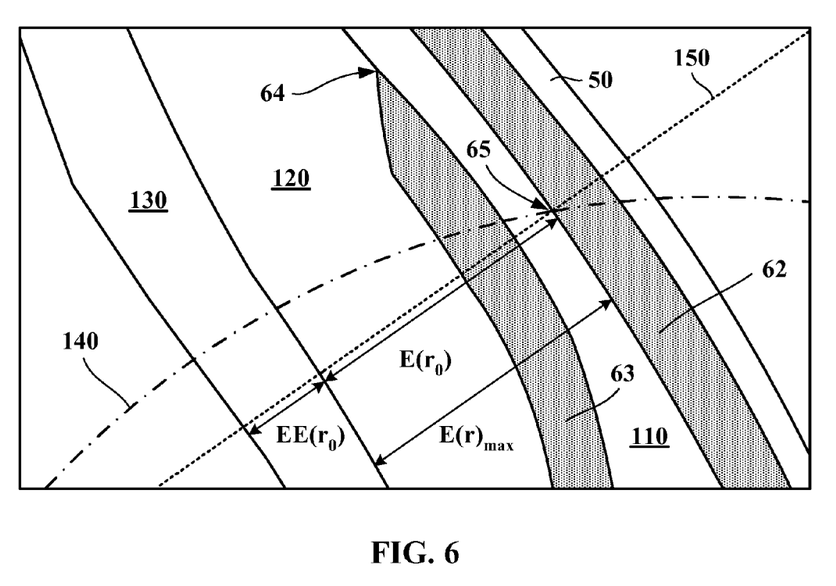

Document WO 2010/072736 also teaches an advantageous bead geometry. Consider the thickness E(r), in a radial cross section, of the entity formed by the apex and the outer strip. FIGS. 5 and 6 illustrate how the thickness E(r) is determined FIG. 6 is an enlargement of the region contained in the box 200 in FIG. 5. Tracking along the interface between the main portion 62 of the carcass reinforcement 60 and the apex 110, each point on this interface is a distance r from the radially innermost point 71 of the annular reinforcing structure 70. If there are several radially innermost points of the annular reinforcing structure, any one of these points is chosen to be the reference point. For a given distance $r_0$, the corresponding point 65 of the interface is found by plotting a circle 140 of radius $r_0$ around the radially innermost point 71 of the annular reinforcing structure 70, as has been depicted in FIG. 5. Next, the direction 150 perpendicular to the main portion 62 of the carcass reinforcement 60 which passes through the point 65 of the interface is plotted. The thickness $E(r_0)$ corresponds to the length of the intersection of the direction 150 with the entity formed by the apex 110 and the outer strip 120. The thickness of the wrapped-around portion 63, if the direction 150 intersects it, is disregarded.

FIG. 6 also indicates the maximum thickness $E(r)_{max}$ of the entity formed by the apex and the outer strip. The ratio $$\frac{E(r)_{max} - DE}{E(r)_{max}},$$

where DE is the maximum axial width of the bead wire 70 (see FIG. 5) is equal to 18% in this instance.

FIG. 6 also shows the thickness $EE(r)$ of the portion 130 of the tire that is axially outside the outer strip 120, for $r=r_0$.

Figure 8:
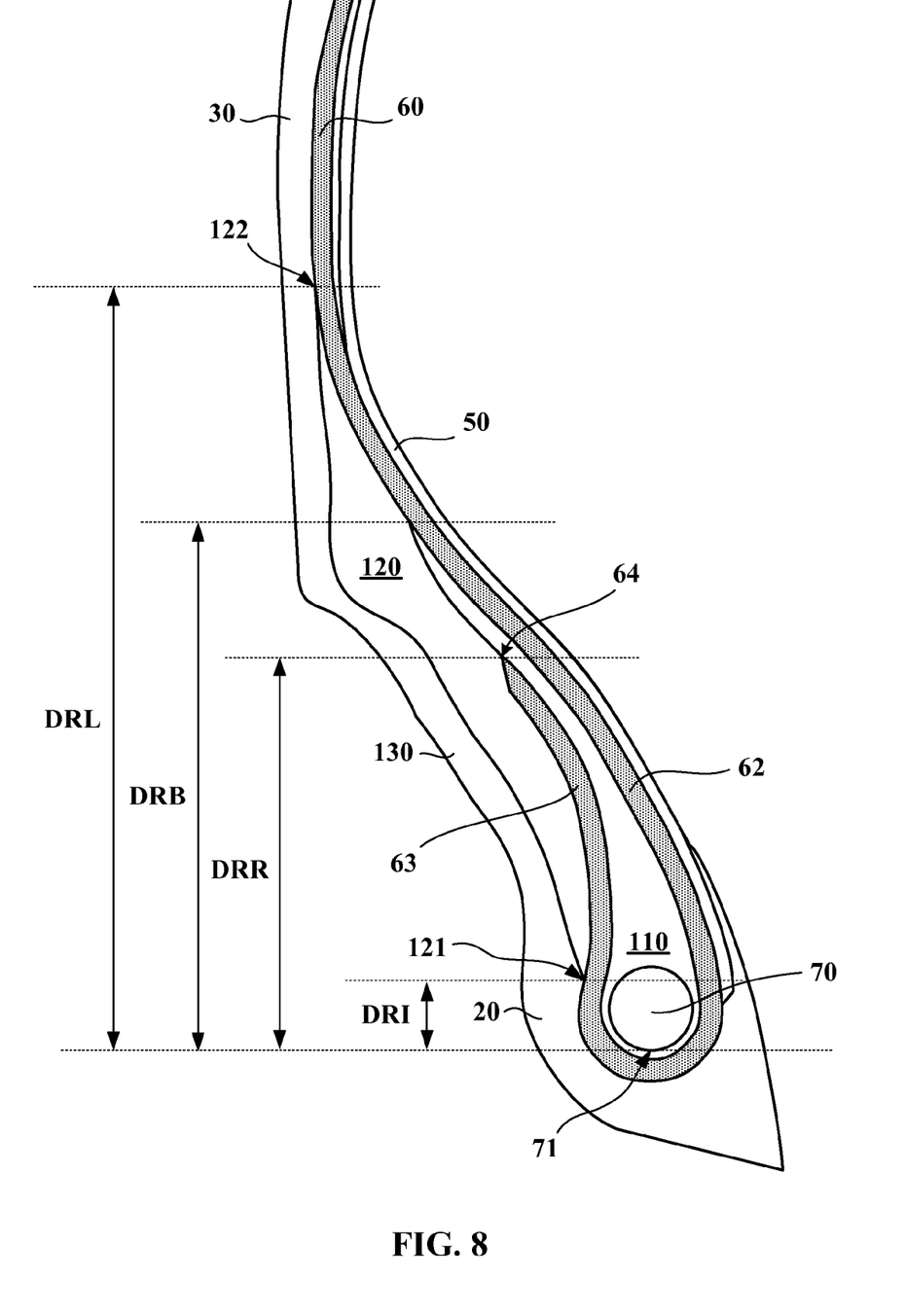
FIGS. 8 and 9 depict, in radial section, a portion of a tire according to embodiments of the invention.
Figure 9:
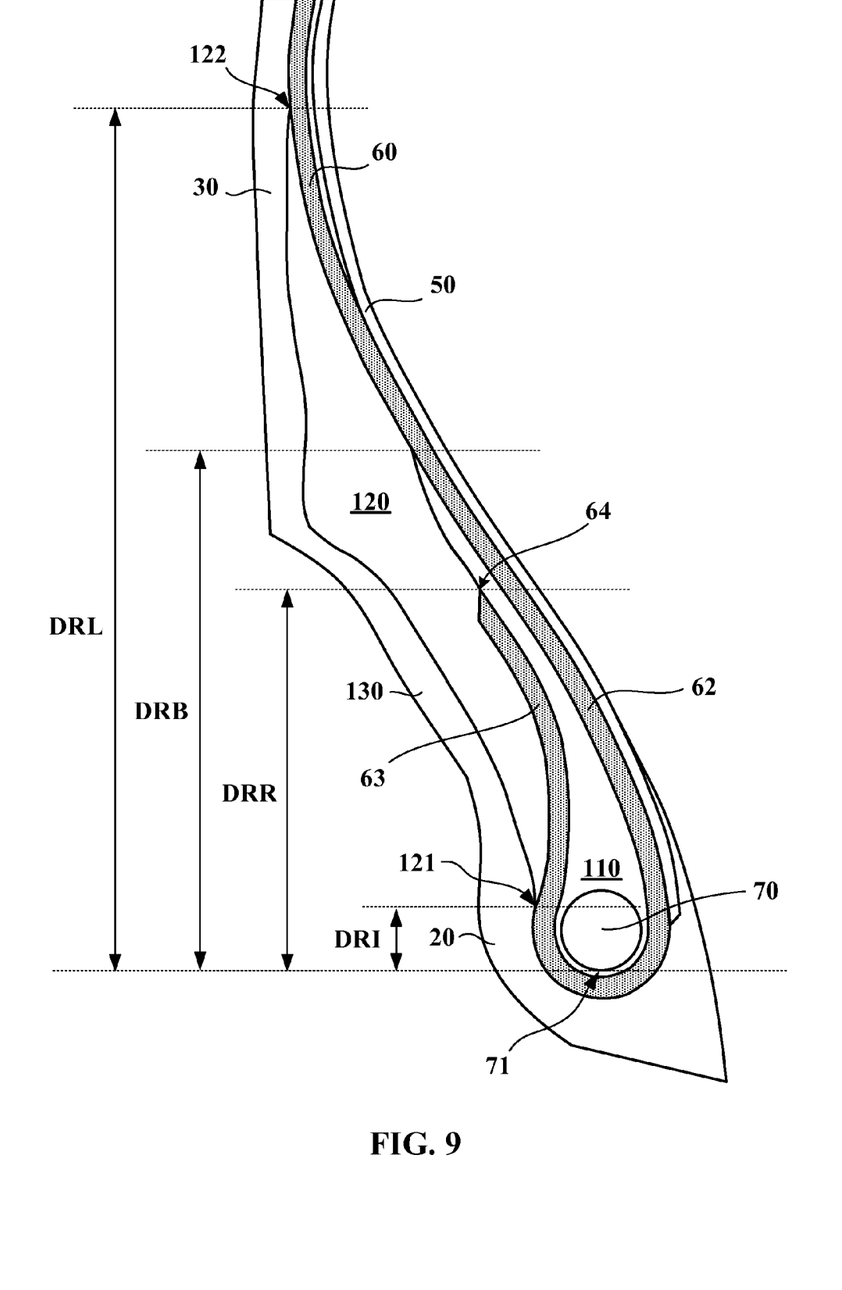

FIGS. 8 and 9 depict, in radial section, a portion of a tire according to embodiments of the invention.

These tires comprise two beads 20 adapted to come into contact with a mounting rim (not depicted), each bead comprising at least one annular reinforcing structure, in this instance a bead wire 70. They further comprise two sidewalls 30 extending the beads radially outwards, the two sidewalls meeting in a crown (not depicted) comprising a crown reinforcement, surmounted by a tread, and a carcass reinforcement 60 extending from the beads through the sidewalls into the crown. The carcass reinforcement 60 comprises a plurality of carcass reinforcing elements. It is anchored into the two beads 20 by wrapping around the annular reinforcing structure 70 so as to form, within each bead 20, a main portion 62 and a wrapped around portion 63. Each wrapped around portion 63 extends radially outwards as far as an end 64 situated a radial distance DRR from the radially innermost point 71 of the annular reinforcing structure of the bead, the radial distance DRR being greater than or equal to 10% of the radial height H of the tire. DRR is equal to 19% of the radial height H for the tires depicted in FIGS. 8 and 9.

Each bead comprises an apex 110, situated radially on the outside of the annular reinforcing structure 70 and at least partially between the main portion 62 and the wrapped around portion 63 of the carcass reinforcement 60. The apex extends radially outside the radially innermost point 71 of the annular reinforcing structure of the bead as far as a radial distance DRB from the said point, the radial distance DRB being greater than or equal to 20% and less than or equal to 30% of the radial height H of the tire. For the tires depicted in FIGS. 8 and 9, DRB is equal to 27% of the radial height H.

Each bead further comprises an outer strip 120 positioned axially on the outside of the carcass reinforcement 60 and of the apex 110, each outer strip 120 extending radially between a radially inner end 121 of the outer strip 120 and a radially outer end 122 of the outer strip 120. The radially inner end 121 is situated a distance DRI from the radially innermost point 71 of the annular reinforcing structure of the bead 20. The radial distance DRI is less than or equal to 20% of the radial height H of the tire. For the tires depicted in FIGS. 8 and 9, DRI is equal to 3% of the radial height H.

The radially outer end 122 of the outer strip is situated a distance DRL from the radially innermost point 71 of the annular reinforcing structure of the bead 20. The radial distance DRL is greater than or equal to 25% of the radial height H of the tire. It is equal to 35% of the radial height H for the tire in FIG. 8, and equal to 45% of the radial height H for the tire in FIG. 9.

The outer strip 120 is made of a rubber compound that has an elastic modulus G' less than or equal to 15 MPa and a viscous modulus G" such that: G"[MPa]≤0.2·G'[MPa]−0.2 MPa, the elastic and viscous modulus values being measured at 23° C.

The entity formed by the apex 110 and the outer strip 120 has a thickness $E(r)$, this thickness being defined as explained above.

Figure 7:
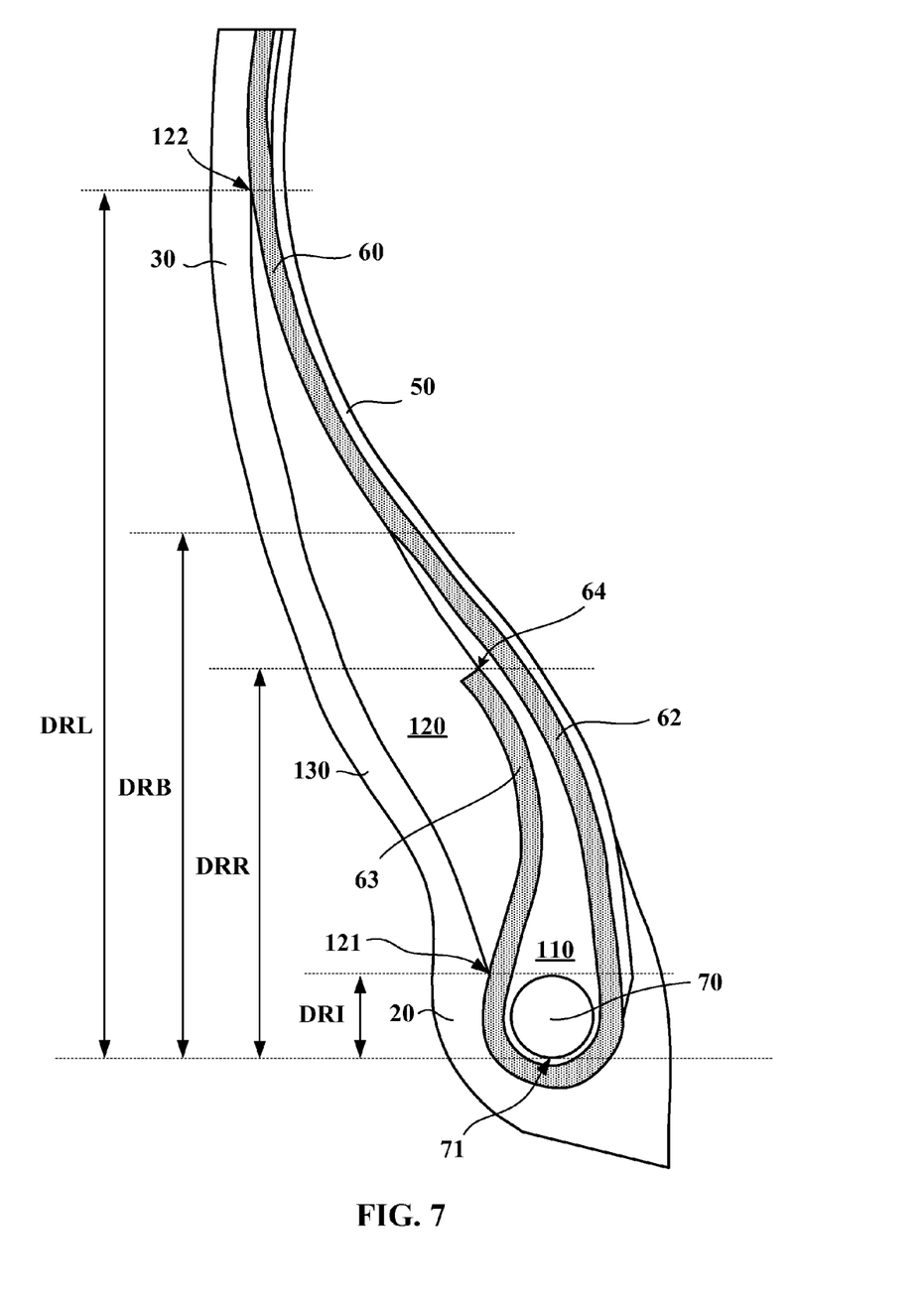
FIG. 7 depicts, in radial section, a portion of a reference tire.
Figure 10:
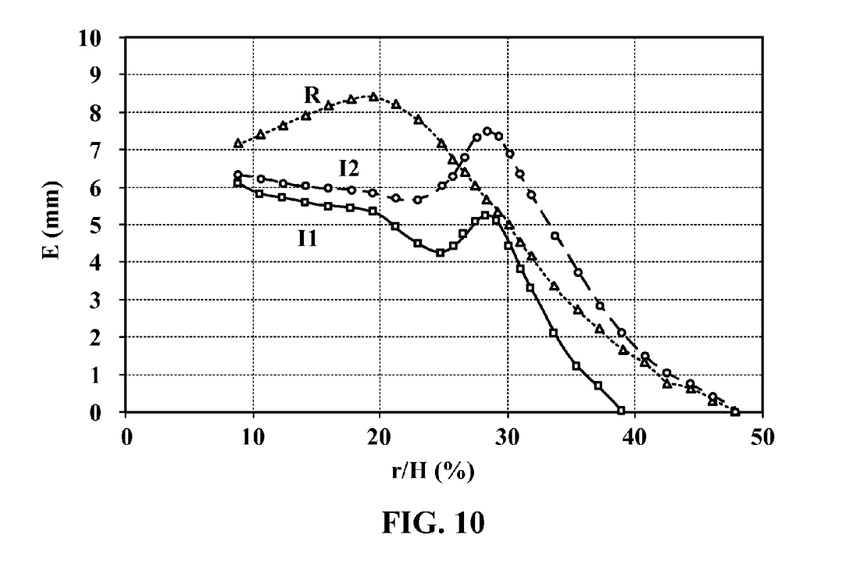
FIGS. 10 and 11 show how the thickness of the entity formed by the apex and the outer strip varies in different tires.
Figure 11:
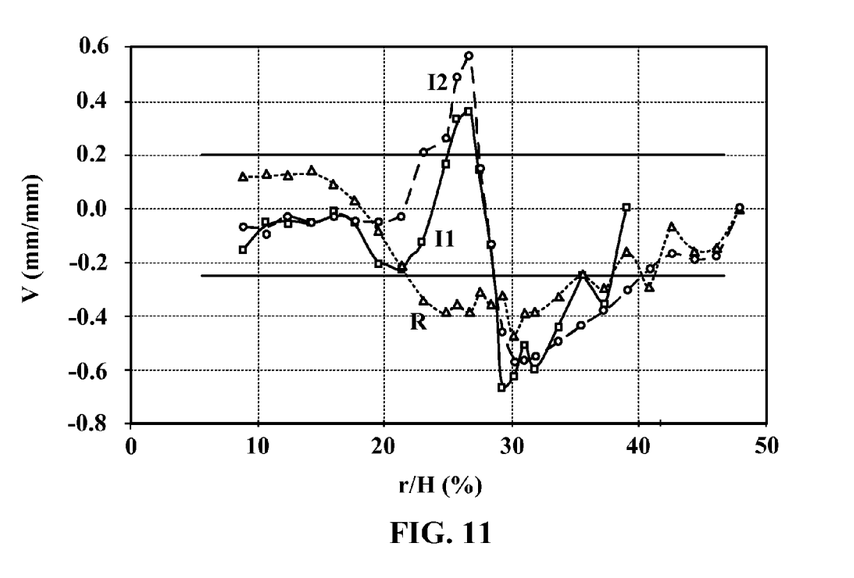

The reference tire depicted in FIG. 7 is disclosed in WO 2010/072736. FIG. 10 depicts how the thickness $E(r)$ varies as a function of the distance r for the reference tire (curve R), a tire according to the invention "I1" (curve 8) and a tire according to the invention "I2" (curve 9). The variation V in their thickness (which is the function $$\frac{\partial E(r)}{\partial r}$$

) as a function of the radius r, is depicted in FIG. 11. It may be seen that, for the three tires, the variation of the thickness $E(r)$ is such that, in the range of distances r comprised between 25 and 45% of the height H of the tire, the variation in thickness $$\frac{\partial E(r)}{\partial r}$$

is less than or equal to −0.25 mm/mm over a first range of distances r of at least 4% of the height H of the tire. Values for such first range of 9% may be seen for the tire of FIG. 8 ("I1"), of 11% for the tire of FIG. 9 ("I2") and 16% for the reference tire ("R"). The tires according to embodiments of the invention differ in that in the range of distances r comprised between 15 and 35% of the height H of the tire, the variation in the thickness $$\frac{\partial E(r)}{\partial r}$$

is greater than or equal to 0.20 mm/mm over a second range of distances r of at least 2% of the height H of the tire. Values for such second range of 2.5% are found for the tire of FIG. 8 ("I1") and of 5% for the tire of FIG. 9 ("I2"). Moreover, in a third range of distances r comprised between 10 and 20% of the height H of the tire, the variation in thickness $$\frac{\partial E(r)}{\partial r}$$

is greater than or equal to −0.10 mm/mm and less than or equal to 0.0 mm/mm over at least 5% of the height H of the tire. Values for such third range of 8% are found for the tire of FIG. 8 ("I1") and of 13% for the tire of FIG. 9 ("I2"), to be compared with less than 2% for the reference tire.

Figure 12:
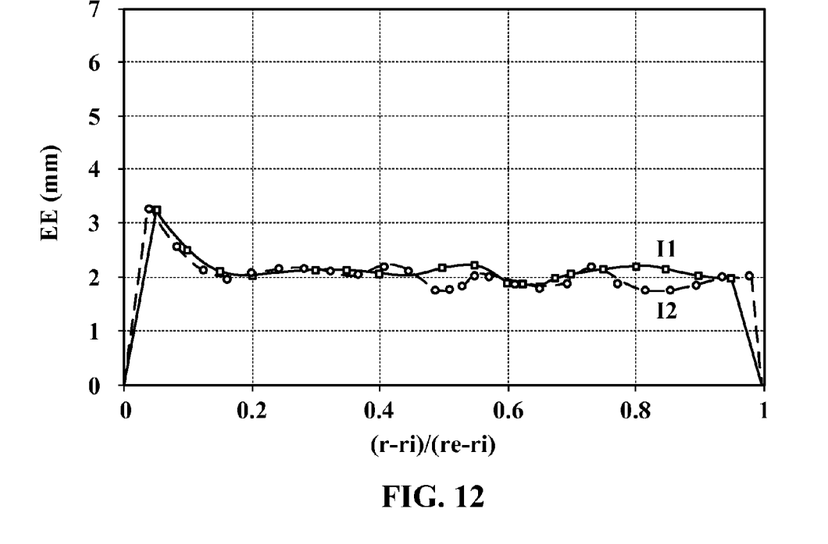
FIGS. 12 and 13 show how the thickness of the portion of the tire that is axially outside the outer strip varies in two tires according to embodiments of the invention.
Figure 13:
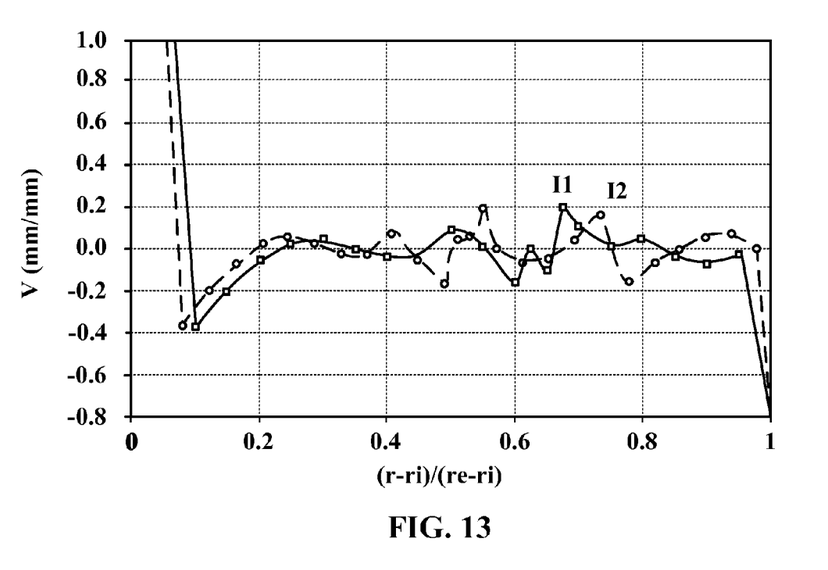

FIGS. 12 and 13 show how the thickness of the portion 130 of the tire that is axially outside the outer strip 120 varies in the same two tires according to embodiments of the invention. In those tires the portion 130 of the tire that is axially outside the outer strip 120 is made of a rubber compound that is different from the rubber compound of which the outer strip is made and preferably has a thickness EE(r) varying such that the variation in thickness $$\frac{\partial EE(r)}{\partial r}$$

is greater than or equal to −0.20 mm/mm and less than or equal to 0.20 mm/mm for r values that are comprised between r=ri+0.20·(re−ri) and r=ri+0.85·(re−ri), where "ri" designates the r value of the radially inner end 121 of the outer strip 120 and "re" designates the r value of the radially outer end 122 of the outer strip 120. This is the case for the tires shown in FIGS. 8 and 9 ("I1" and "I2"). The portion 130 of the tire that is axially outside the outer strip 120 can made of the same rubber compound as the sidewalls 30 of the tire. Suitable rubber compounds are known to those skilled in the art and disclosed, for example, in table 1 of European patent EP 1 097 966. Generally speaking, those rubber compounds do not fulfil the requirements regarding the elastic moduli G' and G" given above for the rubber compounds of which the outer strip 120 is made.

The tires of FIGS. 8 and 9 notably differ in terms of the relative height of the outer strip 120. By reducing this height, the cornering stiffness of the tire is decreased. Thus, the tire of FIG. 8 has a lower cornering stiffness—and a lower rolling resistance—than the tire of FIG. 9, which is appropriate when the tire designer is looking for greater cornering stiffness.

Comparative tests were conducted on tires of dimension 205/55 R16. A tire with a bead as depicted in FIG. 7 (reference "R") was compared against tires with beads as depicted in FIGS. 8 ("I1") and 9 ("2").

TABLE II

| Variables | "R" | "I1" | "I2" |
|---|---|---|---|
| Rolling resistance | 100 | 92 | 97 |
| Cornering stiffness | 100 | 95 | 100 |

As Table II shows, reducing the height of the outer strip (by switching from alternative "I2" to "I1") lowers the rolling resistance. The choice between the alternatives "I1" and "I2" will be made on the basis of cornering stiffness requirements. If lower stiffness is sought then alternative "I1" will be chosen. By contrast, if high cornering stiffness is desired, alternative "I2" is preferable.

More importantly still, the tire according to embodiments of the invention allowed an improvement in manufacturing productivity (number of compliant tires produced per unit time) of around 15% over the tire according to the prior art. No difference in terms of tire endurance was noted.

Furthermore, it will be noted that the special geometry of the outer strip of the tires according to the invention has the effect that these tires are provided with a protective strip that protects the bead against kerbing, etc. without in any way increasing the mass of the tire.

The invention claimed is:
1. A tire comprising:
  two beads adapted to come into contact with a mounting rim, each bead comprising at least one annular reinforcing structure;
  two sidewalls extending the beads radially outwards, the two sidewalls meeting in a crown comprising a crown reinforcement surmounted by a tread;
  at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion, each wrapped-around portion extending radially outwards as far as an end situated a radial distance DRR from the innermost point of the annular reinforcing structure of the bead, the radial distance DRR being greater than or equal to 10% of the radial height H of the tire;
  wherein each bead comprises an apex, the apex being situated radially on the outside of the annular reinforcing structure and at least partially between the main portion and the wrapped-around portion of the carcass reinforcement, the apex extending radially outwards from the radially innermost point of the annular reinforcing structure of the bead as far as a radial distance DRB from said radially innermost point, the radial distance DRB being greater than or equal to 20% and less than or equal to 30% of the radial height H of the tire,
  wherein each bead further comprises an outer strip positioned axially on the outside of the carcass reinforcement and of the apex, each outer strip extending radially between a radially inner end of the outer strip and a radially outer end of the outer strip, the radially inner end of the outer strip being situated at a distance DRI from the radially innermost point of the annular reinforcing structure of the bead, the radial distance DRI being less than or equal to 20% of the radial height H of the tire, the radially outer end of the outer strip being situated at a distance DRL from the radially innermost point of the annular reinforcing structure of the bead, the radial distance DRL being greater than or equal to 25% of the radial height H of the tire,
  wherein the outer strip is made of a rubber compound that has an elastic modulus G' less than or equal to 15 MPa and a viscous modulus G" such that:

$G''[\text{MPa}] \leq 0.2 \cdot G'[\text{MPa}] - 0.2$ MPa, the elastic and viscous moduli being measured at 23° C.;
  wherein an entity formed by the apex and the outer strip has a thickness E(r), this thickness corresponding to the length of the intersection of the direction perpendicular to the main portion of the carcass reinforcement with said entity, r denoting the distance separating intersection of the direction perpendicular to the main portion of the carcass reinforcement from the radially innermost point of the annular reinforcing structure, the thickness E(r) varying such that
  (1) in the range of distances r comprised between 25% and 45% of the height H of the tire, a variation in thickness $$\frac{\partial E(r)}{\partial r}$$

is less than or equal to −0.25 mm/mm over at least 4% of the height H of the tire,
  (2) in the range of distances r comprised between 15 and 35% of the height H of the tire, the variation in thickness $$\frac{\partial E(r)}{\partial r}$$

is greater than or equal to 0.20 mm/mm over at least 2% of the height H of the tire, and
(3) in the range of distances r comprised between 10 and 20% of the height H of the tire, the variation in thickness $$\frac{\partial E(r)}{\partial r}$$

is greater than or equal to −0.10 mm/mm and less than or equal to 0.00 mm/mm over at least 5% of the height H of the tire.

2. The tire according to claim 1, wherein the radial distance DRR between the end of the wrapped-around portion of the carcass reinforcement and the radially innermost point of the annular reinforcing structure of the bead is less than or equal to 20% of the radial height H of the tire.

3. The tire according to claim 1, wherein the radial distance DRL between the radially outer end of the outer strip and the radially innermost point of the annular reinforcing structure of the bead, is greater than or equal to 30% and less than or equal to 45% of the radial height H of the tire.

4. The tire according to claim 1, wherein the apex is made of a rubber compound having an elastic modulus G' less than or equal to 15 MPa and a viscous modulus G" such that:

$G''$[MPa]≤0.2·$G'$[MPa]−0.2 MPa, the elastic and viscous modulus values being measured at 23° C.

5. The tire according to claim 1, wherein, in the range of distances r comprised between 25% and 45% of the height H of the tire, the variation in the thickness $$\frac{\partial E(r)}{\partial r}$$

is less than or equal to −0.3 mm/mm over at least 4% of the height H of the tire.

6. The tire according to claim 1, wherein the portion of the tire that is axially outside the outer strip is made of a rubber compound that is different from the rubber compound of which the outer strip is made and has a thickness EE(r) varying such that a variation in thickness $$\frac{\partial EE(r)}{\partial r}$$

is greater than or equal to −0.20 mm/mm and less than or equal to 0.20 mm/mm for r values that are comprised between r =ri+0.20·(re−ri) and r=ri+0.85·(re−ri), where "ri" designates the r value of the radially inner end of the outer strip and "re" designates the r value of the radially outer end of the outer strip.

* * * * *